United States Patent
Kaneko

(10) Patent No.: US 8,339,666 B2
(45) Date of Patent: Dec. 25, 2012

(54) COLOR PROCESSING APPARATUS AND METHOD THEREOF

(75) Inventor: Chiaki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 12/603,172

(22) Filed: Oct. 21, 2009

(65) Prior Publication Data

US 2010/0110457 A1    May 6, 2010

(30) Foreign Application Priority Data

Oct. 30, 2008  (JP) ................................ 2008-280277

(51) Int. Cl.
*H04N 1/60*  (2006.01)

(52) U.S. Cl. ......... 358/1.9; 358/518; 358/520; 382/162; 382/167

(58) Field of Classification Search .................. 358/518, 358/520, 1.9

See application file for complete search history.

(56) References Cited

U.S. PATENT DOCUMENTS

| | | | |
|---|---|---|---|
| 5,335,097 A | 8/1994 | Murakami | |
| 6,459,436 B1 * | 10/2002 | Kumada et al. | 345/590 |
| 6,542,634 B1 * | 4/2003 | Ohga | 382/167 |
| 6,650,446 B1 * | 11/2003 | Rozzi | 358/520 |
| 6,654,150 B1 * | 11/2003 | Rozzi | 358/520 |
| 6,795,084 B2 * | 9/2004 | Newman | 345/589 |
| 6,859,551 B2 * | 2/2005 | Ohga | 382/167 |
| 6,954,286 B1 * | 10/2005 | Muramoto | 358/1.9 |
| 6,999,617 B1 * | 2/2006 | Ohga | 382/167 |
| 7,027,067 B1 * | 4/2006 | Ohga | 345/589 |
| RE39,161 E * | 7/2006 | Edge et al. | 345/601 |
| 7,085,006 B2 * | 8/2006 | Yokoyama et al. | 358/1.9 |
| 7,158,146 B2 * | 1/2007 | Ohga | 345/589 |
| 7,230,737 B1 * | 6/2007 | Ohga | 358/1.9 |
| 7,339,700 B2 * | 3/2008 | Ohga et al. | 358/1.9 |
| 7,586,657 B2 * | 9/2009 | Ohga | 358/518 |
| 7,701,465 B2 * | 4/2010 | Suzuki et al. | 345/601 |

(Continued)

FOREIGN PATENT DOCUMENTS

JP    2740436    4/1998

(Continued)

OTHER PUBLICATIONS

David Kappos, Subject Matter Eligibility of Computer Readable Media, US Patent and Trademark Office, Feb. 23, 2010, 1351 OG 212.*

(Continued)

*Primary Examiner* — King Poon
*Assistant Examiner* — Ted Barnes
(74) *Attorney, Agent, or Firm* — Cowan, Liebowitz & Latman, P.C.

(57) ABSTRACT

A profile for converting color data dependent on a source device into color data dependent on a destination device, and generation information used in generation of the profile are acquired. Adjustment conditions of the profile designated on a device independent color space are inputted. Color data stored in the profile and dependent on the destination device is converted into first color data on the device independent color space using the generation information. Adjustment is applied to the first color data in accordance with the adjustment conditions. The first color data, to which the adjustment is applied, is converted into second color data dependent on the destination device using the generation information. Color data stored in the profile and dependent on the destination device is modified based on the second color data.

9 Claims, 6 Drawing Sheets

U.S. PATENT DOCUMENTS

| | | | |
|---|---|---|---|
| 7,728,886 B2* | 6/2010 | Ogawa | 348/231.6 |
| 7,973,971 B1* | 7/2011 | Borg | 358/2.1 |
| 7,978,369 B2* | 7/2011 | Haikin | 358/1.9 |
| 7,983,479 B2* | 7/2011 | Suzuki et al. | 382/162 |
| 8,013,903 B2* | 9/2011 | Ohga | 348/222.1 |
| 8,014,599 B2* | 9/2011 | Ohga et al. | 382/167 |
| 8,072,658 B2* | 12/2011 | Namikata | 358/518 |
| 8,081,819 B2* | 12/2011 | Ohga | 382/167 |
| 2005/0190388 A1* | 9/2005 | Kawakami et al. | 358/1.9 |
| 2005/0220954 A1* | 10/2005 | Dayley et al. | 426/503 |
| 2006/0221396 A1* | 10/2006 | Sloan | 358/3.01 |
| 2007/0058181 A1* | 3/2007 | Hatori | 358/1.9 |
| 2007/0058184 A1* | 3/2007 | Kodama | 358/1.9 |
| 2007/0058186 A1* | 3/2007 | Tanaka | 358/1.9 |
| 2007/0188782 A1* | 8/2007 | Sakurai | 358/1.9 |
| 2007/0236759 A1* | 10/2007 | Ohga | 358/518 |
| 2007/0296985 A1* | 12/2007 | Ernst et al. | 358/1.9 |
| 2008/0037041 A1* | 2/2008 | Hasegawa et al. | 358/1.6 |
| 2008/0117227 A1* | 5/2008 | Edge et al. | 345/600 |
| 2008/0150960 A1* | 6/2008 | Edge et al. | 345/600 |
| 2008/0158579 A1* | 7/2008 | Ohga et al. | 358/1.9 |
| 2008/0174798 A1* | 7/2008 | Cho et al. | 358/1.9 |
| 2009/0147279 A1* | 6/2009 | Ming | 358/1.9 |
| 2009/0180128 A1* | 7/2009 | Fowler et al. | 358/1.9 |
| 2009/0296109 A1* | 12/2009 | Maltz et al. | 358/1.9 |

FOREIGN PATENT DOCUMENTS

| | | |
|---|---|---|
| JP | 3305265 | 7/2002 |
| JP | 2003-087589 A | 3/2003 |
| JP | 2007-067939 A | 3/2007 |
| JP | 2007-181251 A | 7/2007 |

OTHER PUBLICATIONS

The above references were cited in a Sep. 7, 2012 Japanese Office Action, a copy of which is enclosed without an English Translation, that issued in Japanese Patent Application No. 2008-280277.

* cited by examiner

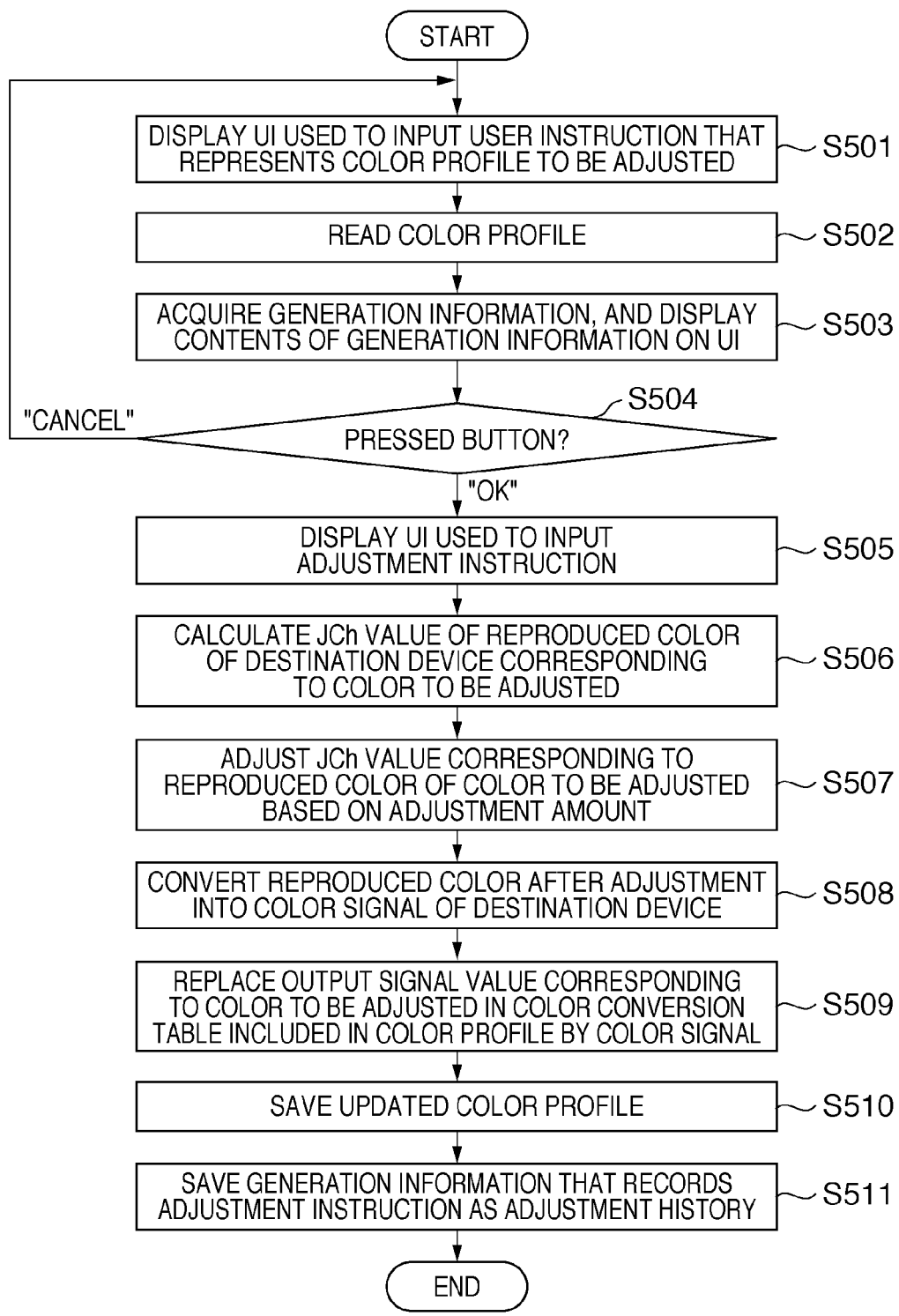

FIG. 5

| | |
|---|---|
| PROFILE GENERATION INFORMATION | ☒ |

| | |
|---|---|
| PROFILE NAME : | Profile 1 |
| DATE & TIME OF CREATION : | YYYY/MM/DD hh:mm:ss |
| USE CASE : | Case 1 |
| SOURCE DEVICE : | MONITOR A |
| INPUT COLOR SPACE : | RGB |
| VIEWING CONDITIONS OF INPUT SIDE : | UNDER D65 ILLUMINANT |
| MAPPING METHOD : | MINIMUM COLOR DIFFERENCE |
| DESTINATION DEVICE : | PRINTER B |
| OUTPUT COLOR SPACE : | CMYK |
| VIEWING CONDITIONS OF OUTPUT SIDE : | UNDER D50 ILLUMINANT |
| OUTPUT MEDIA : | PLAIN PAPER |
| BLACK PLATE SAVING PROCESSING : | ON |
| PARTIAL ADAPTIVE PROCESSING : | ON |
| NUMBER OF GRID POINTS : | STANDARD |
| BIT PRECISION : | 8 BITS |
| COLOR MATERIAL AMOUNT LIMIT VALUE : | 200% |

CANCEL 501    OK 502

# COLOR PROCESSING APPARATUS AND METHOD THEREOF

BACKGROUND OF THE INVENTION

1. Field of the Invention

The present invention relates to color processing for adjusting a profile used to convert color data dependent on a source device into those dependent on a destination device.

2. Description of the Related Art

A color space to be handled by a device such as a monitor or printer, which outputs a color image, is related to that device. For this reason, when a device is controlled to output a color image, image data of that color image has to be converted into that on the color space of the device.

Devices having different types have color gamuts with different shapes and sizes. Therefore, when a color image reproducible by a certain device is to be output by a device which has a narrower color gamut than the former device, a color image with the same colors is not always reproduced. For this reason, color conversion such as gamut mapping is required to allow a device with a narrow color gamut to reproduce colors that cannot be reproduced by that device.

As such color conversion, various methods are available, and color conversion processing is designed for each condition that combines the use application of a color image, the types of device and output medium, viewing conditions of the color image, and the like. The color conversion processing is described in a profile associated with the condition. The profile describes a conversion table, conversion matrix, or conversion function (to be referred to as a color conversion table hereinafter), which represents the relationship between color signals of a source device (to be referred to as input signals hereinafter) and those of a destination device (to be referred to as output signals hereinafter). Upon outputting a color image, by designating an appropriate profile, color conversion processing described in that profile is applied to image data.

In color conversion processing using a profile, if the conversion precision of a color conversion table is insufficient, an ideal color conversion result cannot be obtained. Furthermore, although a color conversion table immediately after creation has sufficient conversion precision, the device characteristics may change due to aging of a device, and a satisfactory color conversion result may not often be obtained. In such case, it is required to re-create or adjust the color conversion table.

When an output image is evaluated, a specific color on an image such as the color of a logotype, or the skin color of a portrait is taken into consideration. Most of logotype colors are spot colors, which are different depending on companies that possess the logotypes. Memory colors represented by a skin color have personal differences. That is, it is difficult to uniquely decide color conversion that obtains color reproducibility preferred for all users. Hence, the color conversion table is adjusted so that more preferable color reproducibility is obtained for each user, and the color reproducibility of colors on which the user attaches importance (important colors) is satisfactory for that user.

As means for adjusting the color conversion table so as to obtain color reproducibility the user desires, a color tone modifying apparatus disclosed by Japanese Patent No. 2740436 is available. With this apparatus, the user inputs, as an adjustment instruction, a color to be modified, an effective range of color modification, and a target value as an adjustment goal of the color to be modified. Then, the apparatus adjusts the color conversion table so that an output color signal corresponding to the color to be modified matches the target value. In this case, designation of the effective range of color modification is facilitated by expressing it by lightness L, saturation S, and hue H as three attributes of a human perceived color. Normally, the color conversion table, which converts color signals of a source device into those of a destination device, does not include any description indicating the correspondence between device colors and perceived colors. For this reason, the invention of Japanese Patent No. 2740436 includes a lookup table (17 in FIG. 2) used to calculate CIEXYZ values from RGB values, CIELab values from the CIEXYZ values, and HSL values from the CIELab values.

The invention of Japanese Patent No. 2740436 inputs the target value as an output signal value. Therefore, the user has to recognize a color signal value on the color space of an output device, which expresses the target value of the color to be modified. The device characteristics are different for respective devices, and the user is required to have a good deal of knowledge about that device so as to appropriately designate the target value as the color signal value of the output device.

SUMMARY OF THE INVENTION

In one aspect, a method of adjusting a profile for converting color data dependent on a source device into color data dependent on a destination device, the method comprises the steps of: acquiring a profile for converting color data of grid points in a color space of the source device into color data in a color space of the destination device, and to acquire generation information used in generation of the profile; inputting adjustment conditions of the profile, which are designated on a device independent color space; converting color data, which is stored in the profile and is dependent on the destination device, into color data on the device independent color space using the generation information; applying adjustment to the color data converted in the first converting step in accordance with the adjustment conditions; converting the color data, to which the adjustment is applied, into color data dependent on the destination device using the generation information; and modifying color data, which is stored in the profile and is dependent on the destination device, based on the color data which is converted by the second converter and is dependent on the destination device.

According to the aspect, profile adjustment is facilitated.

Further features of the present invention will become apparent from the following description of exemplary embodiments with reference to the attached drawings.

BRIEF DESCRIPTION OF THE DRAWINGS

FIG. 4 is a flowchart for explaining color adjustment processing by the color processing apparatus.

FIG. 5 is a view showing an example of generation information displayed on a UI.

DESCRIPTION OF THE EMBODIMENTS

Color processing according to an embodiment of the present invention will be described in detail hereinafter with reference to the drawings.

First Embodiment

[Overview of Color Conversion]

Figure 1:
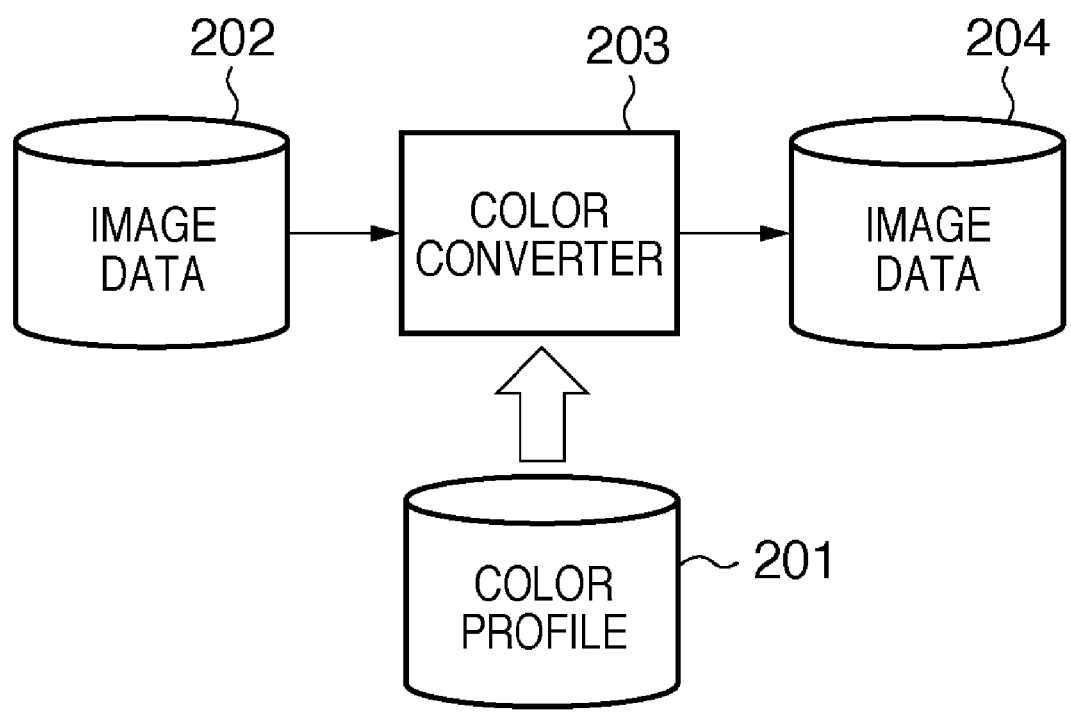
FIG. 1 is a diagram for explaining an overview of color conversion.

FIG. 1 is a diagram showing an overview of color conversion.

A color converter 203 converts image data 202, which is expressed by the color space of a source device (input color space), into image data 204 of the color space of a destination device (output color space) using a color profile 201. Note that the input color space is, for example, an RGB space or CMYK space. The output color space is, for example, a color space expressed by color values corresponding to recording materials of a printer when the destination device is a printer.

Figure 2:
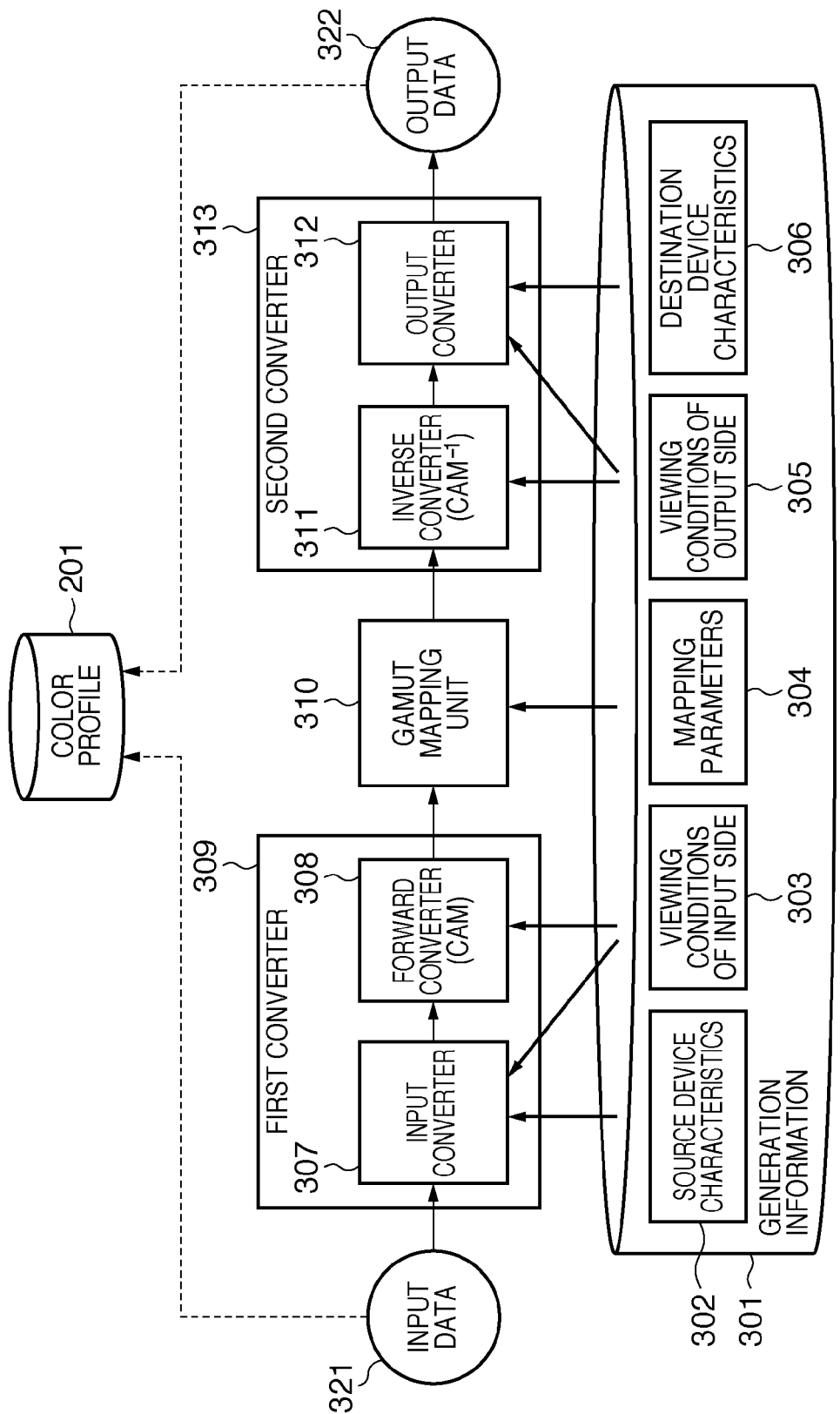
FIG. 2 is a diagram showing an overview of processing for generating a color profile.

FIG. 2 is a diagram showing an overview of processing for generating the color profile 201.

Generation information 301 includes source device characteristics 302, viewing conditions of input side 303, mapping parameters 304, viewing conditions of output side 305, and destination device characteristics 306.

The device characteristics 302 and 306 describe, for example, colorimetric values obtained by measuring reproduced colors of the corresponding devices, that is, characteristic values with reference to a colorimetry illuminant (e.g., D50). The mapping parameters 304 correspond to a mapping function. The device characteristics 302 and 306, and the mapping parameters 304 are expressed as conversion tables represented by lookup tables (LUTs), or conversion matrices, conversion functions, color gamut information, or the like.

When the source device is, for example, a monitor, the viewing conditions of input side 303 include information of the illuminance level and color temperature of an illuminant under viewing conditions of the monitor (to be referred to as a viewing illuminant hereinafter), or the white point of the monitor. When the destination device is, for example, a printer, the viewing conditions of output side 305 include information of the illuminance level and color temperature of a viewing illuminant under viewing conditions of a printout.

An input converter 307 includes a conversion table created based on the source device characteristics 302 and the viewing conditions of input side 303, and converts input data 321 (e.g., RGB data) of the input color space into device independent data (e.g., XYZ or Lab data). A forward converter (CAM) 308 of a color appearance model (e.g., CIECAM02) converts the device independent data into data of a human color appearance space (e.g., Jab or QMh data) based on the viewing conditions of input side 303. Note that a first converter 309 may be configured as a conversion table that combines the input converter 307 and forward converter (CAM) 308.

A method of creating the conversion table of the input converter 307 is described in Japanese Patent No. 3305265. That is, a forward conversion of the color appearance model based on colorimetry conditions is applied to XYZ values of colorimetry illuminant-reference RGB to XYZ relationship data included in the source device characteristics 302. An inverse conversion of the color appearance model based on the viewing conditions of input side 303 is applied to Jab values after the forward conversion to obtain viewing illuminant-reference XYZ values. Then, an RGB to XYZ conversion table is created based on viewing illuminant-reference RGB to XYZ relationship data.

A gamut mapping unit 310 applies gamut mapping to data of the color appearance space using the mapping parameters 304.

An inverse converter 311 ($CAM^{-1}$) of the color appearance model converts data after the gamut mapping into device independent data based on the viewing conditions of output side 305. An output converter 312 includes a conversion table created based on the destination device characteristics 306 and the viewing conditions of output side 305, and converts the device independent data into output data 322 (e.g., CMYK data) of the output color space. Note that a second converter 313 may be configured as a conversion table that combines the inverse converter ($CAM^{-1}$) 311 and output converter 312.

A method of creating the conversion table of the output converter 312 is also described in Japanese Patent No. 3305265. That is, a forward conversion of the color appearance model based on colorimetry conditions is applied to XYZ values of colorimetry illuminant-reference CMYK to XYZ relationship data included in the destination device characteristics 306. An inverse conversion of the color appearance model based on the viewing conditions of output side 305 is applied to Jab values after the forward conversion to obtain viewing illuminant-reference XYZ values. Then, an XYZ to CMYK conversion table is created based on viewing illuminant-reference CMYK to XYZ relationship data.

In this way, color signals (output data 322) of the destination device corresponding to those (input data 321) of the source device are calculated based on the generation information 301. Then, the color profile 201 is generated by converting a color conversion table indicating the correspondence between the input data 321 and output data 322 into a data file of a predetermined format (for example, an ICC profile format). Note that the generation information 301 is independently stored in association with the color profile 201 or is stored in the color profile 201.

As a method of associating the color profile 201 and the generation information 301 with each other, for example, the following method may be used.

At the time of generation of the color profile 201, the generation information 301 including various device characteristics, viewing conditions, and mapping parameters used in the generation is described in one data file. Then, the color profile 201 and generation information 301 are saved to have the same file name except for extensions.

Furthermore, keyword information such as a date and time of generation described in the color profile 201 is also described in the data file of the generation information 301. As a result of such association, upon acquiring the generation information 301, whether or not the color profile 201 and generation information 301 describe the same keyword information is confirmed to prevent an acquisition error of the generation information 301. Also, the data file of the generation information 301 may describe information helpful for the user to confirm the contents of the color profile 201 such as the number of grid points and bit depth of each LUT stored in the color profile 201, and the presence/absence of various kinds of color correction processing at the time of generation of the color profile 201.

[Apparatus Arrangement]

Figure 3:
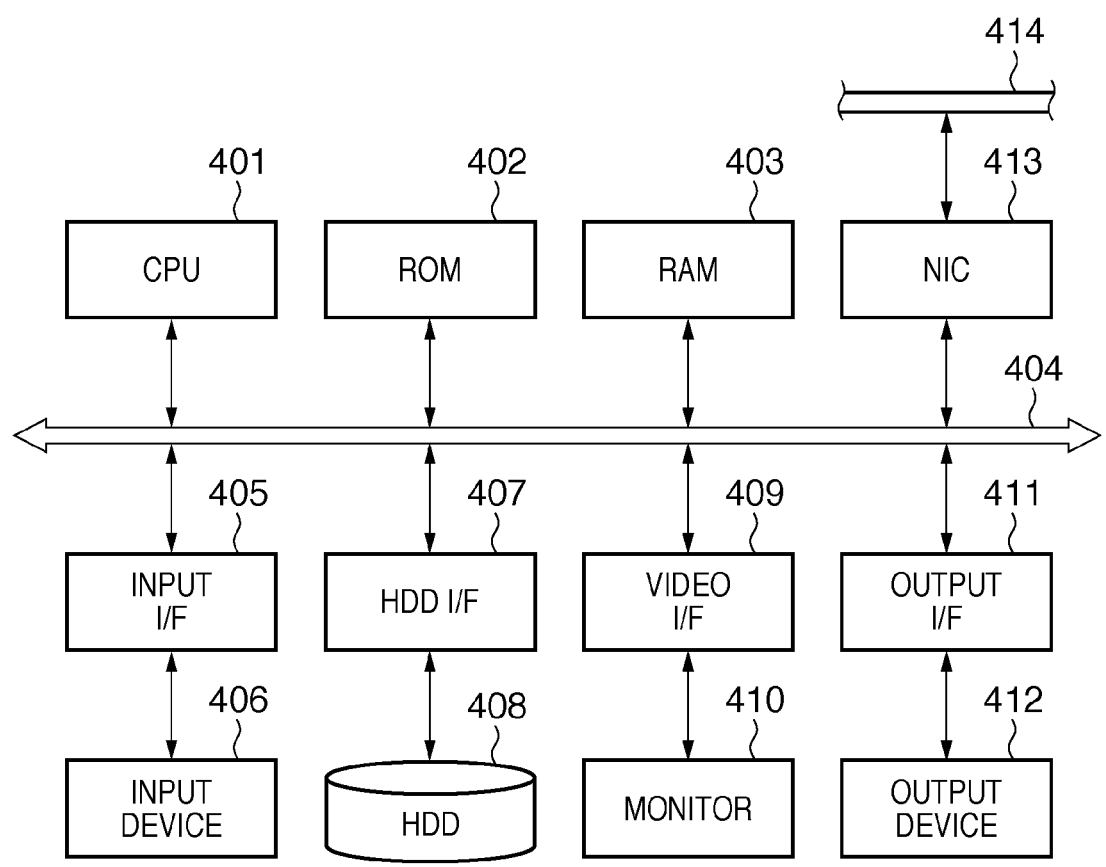
FIG. 3 is a block diagram showing the arrangement of a color processing apparatus according to this embodiment.

FIG. 3 is a block diagram showing the arrangement of the color processing apparatus of this embodiment.

A microprocessor (CPU) 401 executes programs stored in a read only memory (ROM) 402 and hard disk drive (HDD) 408 using a random access memory (RAM) 403 as a work memory. Then, the CPU 401 controls respective units to be described below via a system bus 404, thus executing various kinds of processing including color adjustment processing to be described later.

An input interface (I/F) 405 is a serial bus interface (for example, USB (Universal Serial Bus) or IEEE1394), which connects an input device 406 including a keyboard, mouse, digital camera, scanner, and colorimeter. The CPU 401 can read data from the input device 406 via the input I/F 405.

An HDD I/F 407 is an interface (for example, serial ATA (SATA)) which connects a secondary storage device such as the HDD 408 or an optical disk drive. The CPU 401 can read out data from the HDD 408 and can write data in the HDD 408 via the HDD I/F 407. Furthermore, the CPU 401 can load data stored in the HDD 408 onto the RAM 403, and can similarly save data stored in the RAM 403 in the HDD 408. Then, the CPU 401 can execute data loaded onto the RAM 403 by assuming them as programs.

A video I/F 409 is an interface that connects a monitor 410. The CPU 401 can display arbitrary characters, images, and user interfaces (UIs) on the monitor 410 by controlling the video I/F 409.

An output I/F 411 is a serial bus interface (for example, USB) which connects an output device 412 including a printer, plotter, and film recorder. The CPU 401 sends data to the output device 412 via the output I/F 411 to control it to execute printing or recording. Note that when a two-way communication interface such as USB is used, the input I/F 405 and output I/F 411 can be integrated into one interface.

A network interface card (NIC) 413 is an interface used to connect a network 414.

[Color Adjustment Processing]

FIG. 4 is a flowchart for explaining color adjustment processing by the color processing apparatus. Note that a computer-executable program which describes the processing sequence shown in FIG. 4 is stored in advance in the ROM 402 or HDD 408. The CPU 401 loads that program onto the RAM 403 according to a user instruction, and executes the program to start the color adjustment processing.

The CPU 401 displays a UI used to input a user instruction that represents the color profile 201 to be adjusted (S501), and reads the color profile 201 from the HDD 408 or the like according to the user instruction (S502). The CPU 401 normally loads the color profile 201 onto the RAM 403. However, when the color profile 201 has a large data size, the CPU 401 may load it onto a virtual memory on the HDD 408. Note that the color profile 201 may be acquired not only from the HDD 408 but also from the input device 406 or a server on the network 414.

The CPU 401 then acquires the generation information 301 associated with the color profile 201 from that color profile 201, and displays the contents of the generation information 301 on a UI to inform the user of them (S503). FIG. 5 is a view showing an example of the generation information displayed on the UI. The user confirms the generation conditions of the color profile 201 to be adjusted with reference to the generation information of the profile, and can recognize the detailed contents of the color profile 201.

The user confirms with reference to the generation information of the profile whether or not the color profile 201 read out by the CPU 401 is a color profile to be adjusted. If the readout color profile 201 is a color profile to be adjusted, the user presses an OK button 502; otherwise, he or she presses a cancel button 501. The CPU 401 checks if the user presses the OK button 502 or cancel button 501 (S504). If the user presses the cancel button 501, the process returns to step S501.

If the user presses the OK button 502, the CPU 401 displays a UI that allows the user to input an adjustment instruction as adjustment conditions (S505). The adjustment instruction includes a color to be adjusted, an adjustment amount of that color, and a range that adjustment influences to have the color to be adjusted as the center. The color to be adjusted is given as RGB values (Rt, Gt, Bt), and the adjustment amount is given as JCh values (Jd, Cd, hd). The range that adjustment influences is given as RGB values ($\pm$R, $\pm$G, $\pm$B) as in the color to be adjusted. Note that the range that adjustment influences may be given as JCh values ($\pm$J, $\pm$C, $\pm$h) in correspondence with the adjustment amount. The color to be adjusted designated by the user does not always match a grid point on the color conversion table stored in the color profile 201. In this case, the color of a grid point closest to the color to be adjusted designated by the user is set as a color to be adjusted. Alternatively, a virtual grid point corresponding to the color to be adjusted may be set, and the colors of grid points included in the range that adjustment influences to have the virtual grid point as the center may be adjusted. The following description will be given under the assumption that the color to be adjusted designated by the user matches a grid point on the color conversion table stored in the color profile 201.

The CPU 401 calculates perceived values (JCh values) of a reproduced color of the destination device corresponding to the color to be adjusted (S506).

Figure 6:
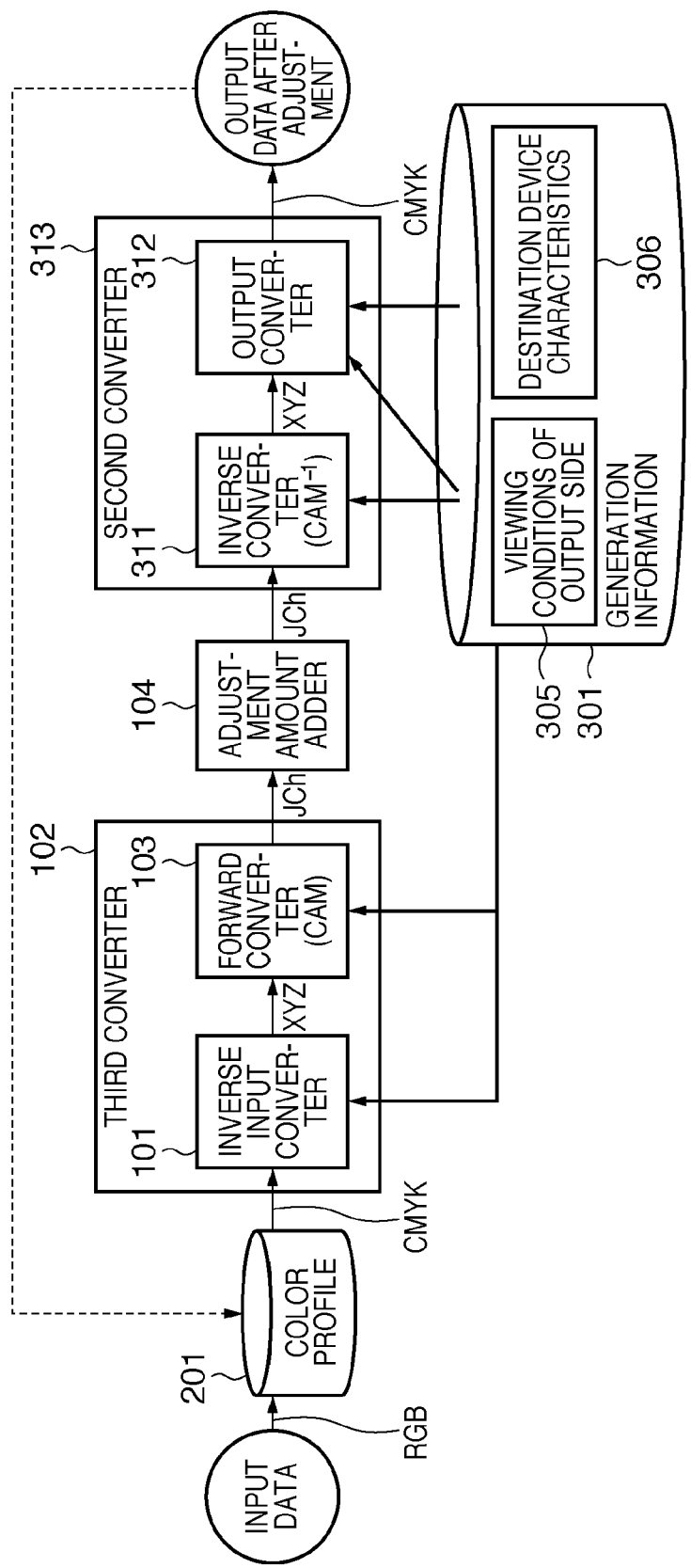
FIG. 6 is a block diagram showing the functional arrangement of the color processing apparatus.

FIG. 6 is a block diagram showing the functional arrangement of the color processing apparatus.

In step S506, the color to be adjusted (Rt, Gt, Bt) is converted into color signal values (Ct, Mt, Yt, Kt) of the destination device by the color profile 201. The color signal values (Ct, Mt, Yt, Kt) are converted by a third converter 102 into JCh values (Jt, Ct, ht) as color data on a device independent color space using the destination device characteristics 306 and viewing conditions of output side 305 in the generation information 301.

The third converter 102 includes an inverse input converter 101 and a forward converter (CAM) 103 of the color appearance model (e.g., CIECAM02). The inverse input converter 101 includes a conversion table which is created based on the destination device characteristics 306 and the viewing conditions of output side 305, and converts values (e.g., CMYK values) on the output color space into device independent data (e.g., XYZ or Lab values). The forward converter (CAM) 103 converts the converted device independent data into JCh values on a human color appearance space based on the viewing conditions of output side 305. Note that the inverse input converter 101 can be created by the same method as the input converter 307.

The JCh values (Jt, Ct, ht) obtained in this way correspond to a color (reproduced color) obtained in such a manner that color data of the color to be adjusted is color-converted using the color profile 201, and the destination device outputs the color-converted color data.

The CPU 401 adjusts the JCh values corresponding to the reproduced color of the color to be adjusted based on the adjustment amount (S507). In step S507, an adjustment amount adder 104 adds the adjustment amount (Jd, Cd, hd) input in step S505 to the reproduced color (Jt, Ct, ht) to obtain a reproduced color (Je, Ce, he) after adjustment.

$$Je = Jt + Jd$$
$$Ce = Ct + Cd \quad (1)$$
$$he = ht + hd$$

The CPU 401 then converts the reproduced color (Je, Ce, he) after adjustment into a color signal (e.g., CMYK values) of the destination device (S508). In step 5508, the second converter 313 converts the reproduced color (Je, Ce, he) after adjustment into a color signal (Ce, Me, Ye, Ke) of the destination device.

Note that the reproduced color (Je, Ce, he) after adjustment may undergo gamut mapping, and the reproduced color after the gamut mapping may be input to the second converter 313. In this way, even when the reproduced color (Je, Ce, he) after adjustment falls outside the color gamut of the destination device, a color signal (Ce, Me, Ye, Ke) indicating a color approximate to the reproduced color after adjustment that the user wants can be obtained.

The CPU 401 replaces output signal values (Ct, Mt, Yt, Kt) corresponding to the color to be adjusted (Rt, Gt, Bt) specified by the color conversion table included in the color profile 201 by the color signal (Ce, Me, Ye, Ke) (S509).

As for the colors of grid points of the color conversion table, which are included in the range that adjustment influences, the CPU 401 calculates color signals corresponding to colors after adjustment and replaces corresponding output signal values by the calculated color signals by repeating the processes in steps S506 to S509. The adjustment amount of the color of each grid point on the color conversion table, which is included in the range that adjustment influences, assumes a value calculated by multiplying the adjustment amount designated by the adjustment instruction by, for example, a weight value which decreases from the center according to the distance from the center to have the color to be adjusted (center) as "1" and the boundary of the range that adjustment influences as "0". In this way, color adjustment that maintains continuity of colors between the adjusted colors and non-adjusted colors outside the range that adjustment influences can be attained.

The CPU 401 then saves the updated color profile 201 (whose output signal values are replaced) in the HDD 408 or the like (S510). In this case, the CPU 401 saves the generation information 301, which additionally records the adjustment instruction as an adjustment history, as that corresponding to the updated color profile 201 (S511).

Modification of Embodiment

In the example of the above description, the color to be adjusted is designated as signal values on the input color space. However, the color to be adjusted may be designated using signal values of any other color spaces as long as the color to be adjusted can be specified. For example, when the color to be adjusted is designated using JCh values, the conversion from the color to be adjusted into a color signal of the destination device may be attained by the gamut mapping unit 310 and second converter 313 in place of the color profile 201. Alternatively, the color to be adjusted (JCh values) may be converted into signal values on the input color space based on the viewing conditions of input side 303 and source device characteristics 302. Also, by adopting an arrangement in which the third converter 102 and second converter 313 do not include the forward converter 103 and inverse converter 311, the color to be adjusted can be designated as device independent data (e.g., XYZ or Lab values) in place of the perceived values.

In the example of the above description, the generation information 301 includes the destination device characteristics 306 and viewing conditions of output side 305. However, the generation information 301 need only include information (data indicating the correspondence between the color signals of the destination device and perceived colors) required to create at least the third converter 102 and second converter 313.

As described above, the color profile 201 is adjusted using the generation information 301 at the time of generation of the color profile 201 by inputting the adjustment instruction including the color to be adjusted and the range that adjustment influences, which are expressed by the values on the input color space, and the adjustment amount which is expressed by the values on the color appearance space. Therefore, the user can attain color adjustment that is easy to intuitively understand regardless of the characteristics of the destination device, and can easily generate a color profile that reflects the intention and favor of the user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-280277, filed Oct. 30, 2008, which is hereby incorporated by reference herein in its entirety.

What is claimed is:

1. A color processing apparatus for adjusting a table which indicates a correspondence between color data dependent on a source device and color data dependent on a destination device, the apparatus comprising:

a storing section, configured to store the table for converting color data of grid points in a color space of the source device into color data in a color space of the destination device, and to store generation information used in generation of the table;

an input section, configured to input adjustment conditions of the table, which include a color to be adjusted, a color range influenced by adjustment and defined by an upper color value and a lower color value, and an adjustment amount, wherein the color to be adjusted is designated on a color space different from the color space of the destination device, the color range is designated on a color space different from the color space of the destination device, and the adjustment amount is designated on a device independent color space;

a first converter, configured to convert color data, which is stored in the table and is dependent on the destination device, into color data on the device independent color space using the generation information, wherein the color data corresponds to the color to be adjusted and is included in the color range;

an adjustor, configured to apply the adjustment to the color data converted by the first converter in accordance with the adjustment amount;

a second converter, configured to convert the color data, to which the adjustment is applied, into color data dependent on the destination device using the generation information; and a replacement section, configured to replace color data, which is stored in the table and is dependent on the destination device, with the color data which is converted by the second converter and is dependent on the destination device, wherein the adjustor adds the adjustment amount to the color data in the device independent color space corresponding to the color to be adjusted, and adds values, which are obtained by weighting the adjustment amount according to distances between the color to be adjusted and colors included in the color range, to color data which are included in the color range and are converted by the first converter.

2. The apparatus according to claim 1, wherein the color space different from the color space of the destination device comprises the color space of the source device and the device independent color space.

3. The apparatus according to claim 1, further comprising an informing section configured to inform information upon generation of the table based on the generation information.

4. The apparatus according to claim 1, further comprising a recorder configured to record the adjustment conditions in the generation information as an adjustment history.

5. The apparatus according to claim 1, wherein the first converter converts the color to be adjusted into the color data dependent on the destination device using the table.

6. The apparatus according to claim 1, wherein the generation information includes at least information indicating viewing conditions of an output of the destination device and device characteristics of the destination device.

7. The apparatus according to claim 1, wherein the first converter, the adjustor, the second converter, and the replacement section apply the first conversion, the adjustment, the second conversion, and the replacement to colors included in the color range.

8. A method of adjusting a table which indicates a correspondence between color data dependent on a source device and color data dependent on a destination device, the method comprising:
   a storing step of storing the table for converting color data of grid points in a color space of the source device into color data in a color space of the destination device, and storing generation information used in generation of the table;
   an inputting step of inputting adjustment amount, wherein the color to be adjusted is designated on a color space different from the color space of the destination device, the color range is designated on a color space different from the color space of the destination device, and the adjustment amount is designated on a device independent color space;
   a first converting step of converting color data, which is stored in the table and is dependent on the destination device, into color data on the device independent color space using the generation information, wherein the color data corresponds to the color to be adjusted and is included in the color range;
   an applying step of applying the adjustment to the color data converted in the first converting step in accordance with the adjustment amount;
   a second converting step of converting the color data, to which the adjustment is applied, into color data dependent of the destination device using the generation information; and
   a replacing step of replacing color data, which is stored in the table and is dependent on the destination device, with the color data which is converted in the second converting step and is dependent on the destination device, wherein the applying step adds the adjustment amount to the color data in the device independent color space corresponding to the color to be adjusted, and adds values, which are obtained by weighting the adjustment amount according to distances between the color to be adjusted and colors included in the color range, to color data which are included in the color range and are converted by the first converter.

9. A non-transitory computer-readable medium storing a computer-executable program for causing a computer to perform a method of adjusting a table which indicates a correspondence between color data dependent on a source device and color data dependent on a destination device, the method comprising:
   a storing step of storing the table for converting color data of grid points in a color space of the source device into color data in a color space of the destination device, and storing generation information used in generation of the table;
   an inputting step of inputting adjustment conditions of the table, which include a color to be adjusted, a color range influenced by adjustment and defined by an upper color value and a lower color value, and an adjustment amount, wherein the color to be adjusted is designated on a color space different from the color space of the destination device, the color range is designated on a color space different from the color space of the destination device, and the adjustment amount is designated on a device independent color space;
   a first converting step of converting color data, which is stored in the table and is dependent on the destination device, into color data on the device independent color space using the generation information, wherein the color data corresponds to the color to be adjusted and is included in the color range;
   an applying step of applying the adjustment to the color data converted in the first converting step in accordance with the adjustment amount;
   a second converting step of converting the color data, to which the adjustment is applied, into color data dependent on the destination device using the generation information; and
   a replacing step of replacing color data, which is stored in the table and is dependent on the destination device, based on the color data which is converted in the second converting step and is dependent on the destination device, wherein the applying step adds the adjustment amount to the color data in the device independent color space corresponding to the color to be adjusted, and adds values, which are obtained by weighting the adjustment amount according to distances between the color to be adjusted and colors included in the color range, to color data which are included in the color range and are converted by the first converter.

* * * * *